(No Model.) 2 Sheets—Sheet 1.
C. P. TATRO.
UNDERGROUND CONDUIT FOR ELECTRIC RAILWAYS.
No. 466,471. Patented Jan. 5, 1892.
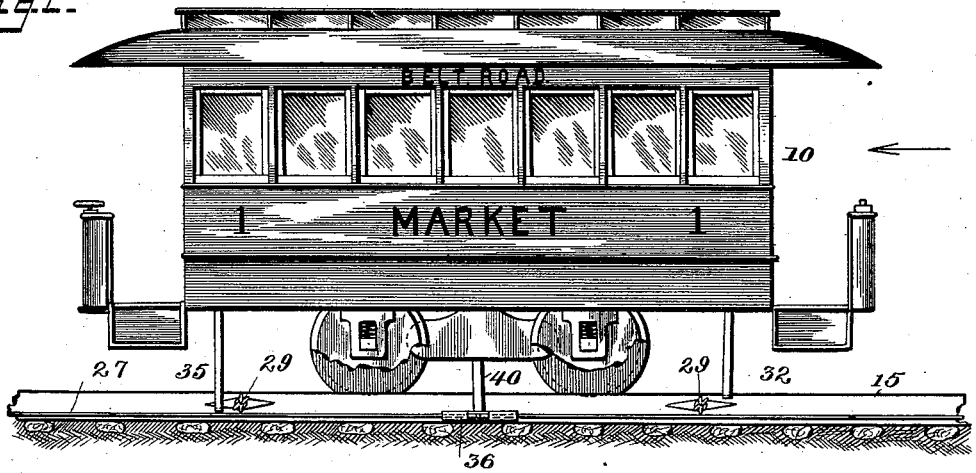
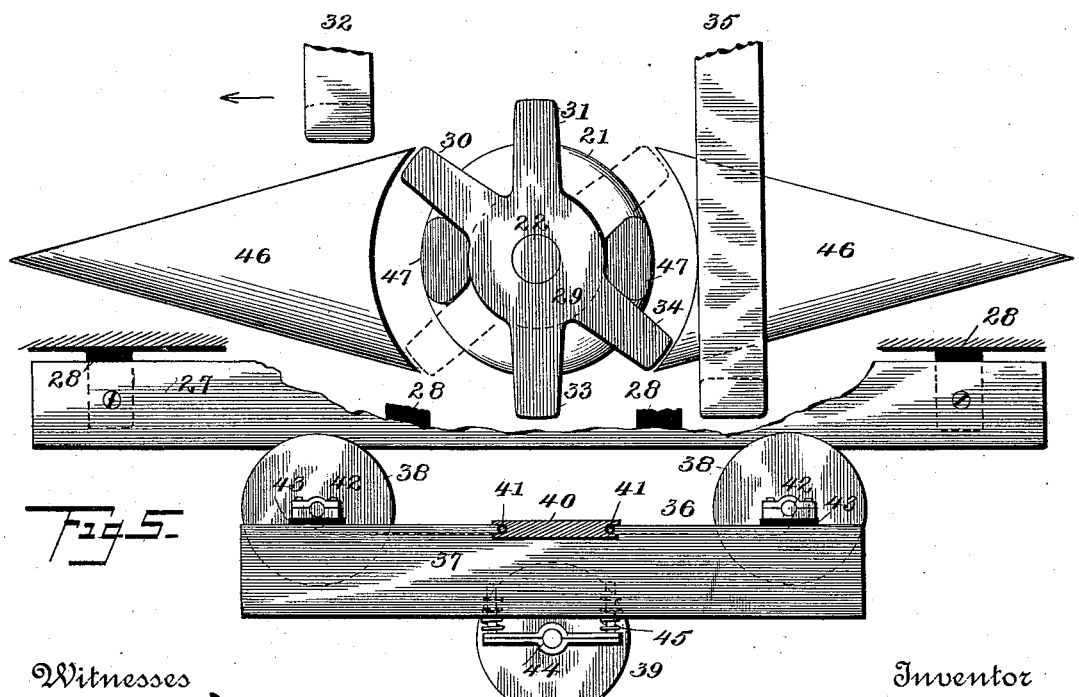
Witnesses
John Imirie
M. C. Hillyard.
Inventor
Charles P. Tatro.
By his Attorney W. K. Stevens (No Model.) 2 Sheets—Sheet 2.
C. P. TATRO.
UNDERGROUND CONDUIT FOR ELECTRIC RAILWAYS.
No. 466,471. Patented Jan. 5, 1892.
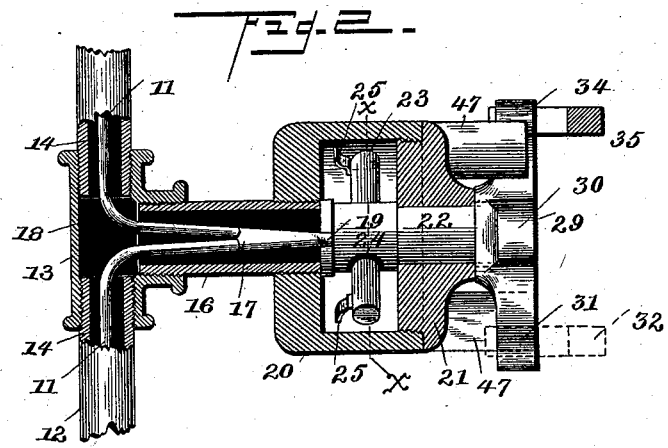
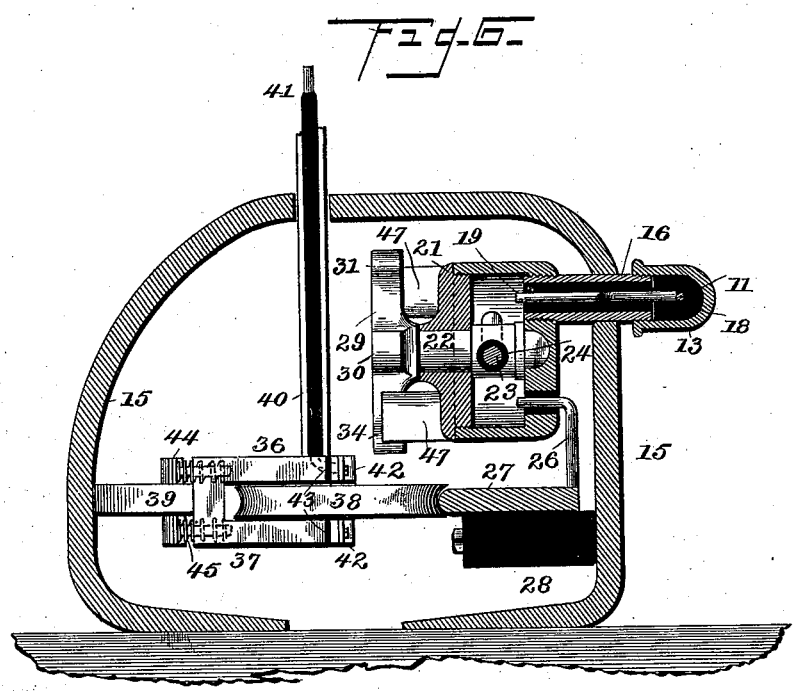
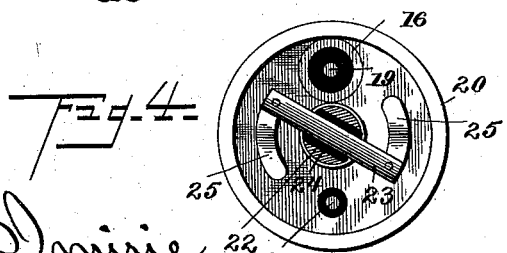
Witnesses
John Irvine
M. C. Hillyard
Inventor
Charles P. Tatro
By his Attorney W. X. Stevens.

UNITED STATES PATENT OFFICE.

CHARLES P. TATRO, OF SPOKANE, WASHINGTON.

UNDERGROUND CONDUIT FOR ELECTRIC RAILWAYS.

SPECIFICATION forming part of Letters Patent No. 466,471, dated January 5, 1892.

Application filed November 14, 1891. Serial No. 411,931. (No model.)

*To all whom it may concern:*

Be it known that I, CHARLES P. TATRO, a citizen of the United States, residing at Spokane, in the county of Spokane and State of Washington, have invented certain new and useful Improvements in Underground Conduits for Electric Railways; and I do hereby declare the following to be a full, clear, and exact description of the invention, such as will enable others skilled in the art to which it appertains to make and use the same.

My invention relates to underground conduits for electric railways; and its object is to provide as follows: first, means for obtaining continuous electric communication between an insulated line-wire buried along the road as an electric conduit and one or more cars traveling on the road; second, means for perfectly insulating a buried live line-wire and for temporarily communicating with branch ends of segments thereof without exposing the said ends or any other portion of the said line-wire, or its immediate insulator to the open atmosphere or to moisture, whereby loss of electric energy would result; third, means whereby any car may make communication with a single line-wire to be propelled either forward or backward upon the same track, and, fourth, means for overcoming the variation from its perfect line of travel of each communicator-arm of the car, whereby proper registry thereof with the coacting parts located on the road is insured.

To this end my invention consists in the construction and combination of parts forming an underground conduit for an electric railway, hereinafter described and claimed, reference being had to the accompanying drawings, in which—

Figure 1 represents an electric railway-car in side elevation, showing the relative positions of the turnstiles in the underground channel and the hangers upon the car adapted to register with the turnstiles, and also segmental tracks and a trolley adapted to receive electric energy from the said tracks. Fig. 2 represents a joint in the conduit in horizontal section, showing the means of connecting wires thereat and the means of communication to receive electric energy therefrom. Fig. 3 represents the turnstiles as seen from the right-hand end in Fig. 2. Fig. 4 is a transverse vertical section at line *x* of Fig. 2. Fig. 5 is a top view of one of the trolleys, also showing a portion of the channel in horizontal section. Fig. 6 is a transverse vertical section of the channel, showing an end view of the interior parts.

10 represents a car provided with a motor, which is adapted to be driven by electric energy received from a line-wire 11 to propel the car upon the road by the aid of the trolley system, this line-wire being the electric conduit proper.

12 represents a pipe such as that used for water or gas distribution, cut in lengths somewhat shorter than the length of a car and joined at its ends by means of the usual T-coupling 13. This pipe serves as a complete casing to protect the line-wire 11, which is located within it and separated from it by insulating material 14. The ends of the wire project some distance from each end of the line-pipe, that distance to correspond to the distance which the pipe lies from the channel 15, and a branch pipe 16, secured to the T-coupling, covers the projecting wires. In constructing this joint first pass the end of a wire into one end of the T and then out at the side opening. Then screw its pipe in place. Second, put the other wire and pipe in place in the same manner, and after bringing the wire ends together side by side, as shown in Fig. 2, solder them along the portion 17 to insure permanent metallic contact. Third, screw in the branch pipe 16, and then pour insulating material 18 in to entirely fill the cavity around the wires. Now shape the end 19, as required, and then screw a shield 20 upon the end of the branch 16, which projects within the channel-wall 15.

21 is a cap screwed firmly into the body of the shield and serves as one bearing for a rock-shaft 22, the other bearing being in the bottom of the box.

23 is the switch, fixed permanently in the shaft 22, but insulated therefrom by means of a hard-rubber bushing 24 or other suitable material.

25 25 are contact-springs secured upon the arms of the switch 23, one spring to slide on and off the incoming end 19 of the line-wire 11 and the other spring to slide at the same time on and off the end of the outgoing wire 26.

27 represents the conducting-rail divided into a series of segments corresponding in length with the segments of the conduit-pipe 12. Each rail-segment is permanently fixed within the channel upon insulating-blocks 28 and is connected with an outgoing wire 26.

29 is a turnstile fixed upon the switch-shaft 22 and provided with arms 30 and 31, to be engaged by a hanger 32, which depends from the car through the slot in the top of the channel, and with arms 33 and 34, to be engaged by another hanger 35.

44 represents wedge-shaped guides whereby the ends of hangers 32 and 35 will be directed to their respective ends of the turnstile if the parts should become loose by long wear.

36 is the trolley, comprising a body of wood 37, two wheels 38, journaled upon the body to engage and roll upon the track 27, a third wheel 39, journaled upon the body 37 midway to roll against the wall 15 of the channel, a hanger 40, depending from the car midway to hold the trolley, and insulated wires 41, passing in grooves up the edges of the hanger 40 and connecting the bearings of the wheels 38 with the motor on the car. The journal-bearings 42 of the wheels 38 are insulated from the wood 37 by any suitable material 43 to prevent loss of electricity if the wooden body becomes wet. The wheel 39 is mounted midway between and opposite to the wheels 38 to form the third element of a tripod-bearing for the trolley, whereby perfect contact of the wheels 38 with the rail 27 will be insured, and the wheel 39 is free to travel in a vertically-irregular track varying laterally from its line of movement to accommodate the trolley to any irregularities of distance between the track 27 and the opposite wall 15 in going around curves or otherwise, and I mount the bearing 44 upon the bar 37 by means of springs 45 or any similarly-yielding connections to further aid in this direction.

In operation, let us suppose the car to be moving to the left. In Figs. 3 and 4 the switch is set with the circuit open as it would have been left by the passage of the rear hanger 32 of the previous car; but when the forward hanger 35 of this car strikes the arm 33 the turnstile will be rocked to the position shown in dotted lines and the switch-arms 25 be brought in contact with the live-wire end 19 and the rail-wire 26, whereby the current is directed through the rail, the trolley-wheels 38, and the wires 41 to the motor, and thence to the ground in any usual manner, as by the car-wheels and rails, thus switching enough current through the motor to propel the car. The hangers 35 and 32 are located upon the car near its ends about a foot farther apart than the length of a rail-segment and the switches are set midway the rail-segments, so that the trolley at the middle of the car will always have one of its wheels at least upon a live rail and each rail will be switched dead at the instant when the rear trolley-wheel has passed a few inches onto the next rail forward. Just at the time when the two trolley-wheels bridge across the insulated ends of the rail-segments both those rails are alive, but the rear rail is left alive only long enough to insure the passage of the joint, the hanger 35 of each car closing the switch to vitalize each rail as the car goes forward to the left and the hanger 32 opening the switch to kill the same rail after the trolley has passed off from it. Now if the motor be reversed to back the car the hanger 32 becomes the forward one, and by acting to the right on arm 30 it closes the switch, while 35 becomes the rear hanger, and acting to the right against arm 34 opens the switch. Thus the motor is handled like a locomotive-engine, the engineer having nothing to change but merely to reverse the motor in the usual manner in order to travel the other way.

I have provided lugs 47, fixed upon the cap 21, to stop the arms of the turnstile from being rocked too far in either direction in rapid service and enabling the constructer of a line to set the shields exactly right relative to the wires ending therein by noting the location of these outside lugs.

The walls 15 of the channel may be of any usual or preferred construction; but it is advisable to leave the bottom open for the free escape of water and to give good under drainage to take the same entirely away. By this system the conduit or main-line wire may be located close beside the channel or in it or far enough to one side of the tracks to serve two tracks at the same time, the branches 16 17 in each case being long enough to reach the desired spot in the channel to have the shield 20 screwed solidly upon the branch, thus leaving no open idle point for the waste of electric energy and entirely protecting both the wire and its insular covering from the intrusion of moisture from wear and from accidental damage.

The rails are made in segments disconnected from the live wire at all times, except when a car is passing, for two reasons: first, in order that they may not offer an exposed idle surface for the escape of electric energy, and, second, though they are at all times out of reasonable reach of the public, yet by leaving them dead, except at the instant when a car is passing over each, it reduces the chances for an accident by contact with any live conductor of this system almost impossible.

A covered switch to make and break connection between common insulated wires would not meet this invention unless the said cover were mechanically secured to a shield for both the wire and its insular covering.

A common turnstile fitted to revolve completely around in operating a switch or to be turned but one way would not be an equivalent of this invention, because the same hangers could not operate it to back a car.

If the two lines of a double-track road are to be operated by a single line-wire buried between them, a common pipe cross-connection may be used in place of the T and the joined wires made to extend laterally each way. Of course the branch of the T might be extended and the shield fastened over the end thereof instead of using the separate branch pipe 16, or the T itself might be shaped with the shield-body attached; but I prefer to adopt the construction for use with common pipe connections such as are already common and readily obtainable. The outgoing wire 26 is properly an intercepted or broken portion of the branch wire 19.

Having thus fully described my invention, what I believe to be new, and desire to secure by Letters Patent, is the following:

1. The combination, in conduits for electric railways, of a series of pipe-sections having an insulated wire in each, the wire having projecting branch ends, a branch coupling joining the adjacent ends of pipe-sections, a branch pipe in the coupling covering the branch ends of wire, the said branches being secured together in a metallic contact, and a switch-shield secured upon the said branch pipe over the end of the said wires, substantially as described.

2. The combination of a pipe, an electric line-wire insulated therein and projecting from the end thereof, a shield secured upon the pipe over the end of the wire, an outgoing wire from the shield, a switch journaled to rock in the shield to make and break connection between the said line-wire and outgoing wire, a turnstile upon the switch-shaft having oppositely-projecting arms outside the shield adapted to be engaged by hangers from a car, and lugs in the path of the turnstile, substantially as described, whereby the rotary motion of the switch is limited.

3. The combination, in electric conduits for railways, of a line-wire provided with broken branches, a shield covering the broken ends of the branches, a turnstile mounted on a shaft journaled in the said shield, a switch-bar passing radially through the said shaft and insulated therefrom, and contact-springs upon the said bar adapted to make and break electric connection between the said branch ends, substantially as described.

4. The combination of an electric line-wire having lateral branches, a series of segmental rails fixed along a road and provided each with a branch wire, a switch adapted to make and break connection between the said branch wires and mounted on a rock-shaft, a turnstile having cross-arms fixed upon the rock-shaft in the path of arms depending from the car, and means, substantially as described, for limiting the turnstile to an oscillating movement, whereby the operation of the switch is reversed by reversing the direction of travel of the car.

5. The combination, in conduits for electric railways, of an electrical switch comprising a turnstile having two pairs of oppositely-projecting arms, a lug to limit the motion of the arms, and hangers upon the car adapted to strike opposite arms of the turnstile alternately to give an oscillating motion thereto, substantially as described, whereby the switch will be operated properly whether the car be run forward or backward upon the same track.

6. The combination, in conduits for electric railways, of an electric switch mounted upon a rock-shaft provided with turnstile-arms, hangers from the car adapted to engage the said arms at opposite ends alternately, and guiding-wedges for the hangers, located in line of the turnstile, substantially as described.

7. The combination, in conduits for electric railways, of an electric rail located along the road, a wall opposite thereto, and a trolley having two wheels to roll on the rail, and one wheel opposite to and intermediate between the two wheels to roll freely on the wall, there being a yielding connection between one of the said wheels and the trolley-body, substantially as described, whereby the trolley is kept in contact with the conducting-rail at one side, but is free to move on the other side transversely to the line of travel to conform to the irregularities of the track.

In testimony whereof I affix my signature in presence of two witnesses.

CHARLES P. TATRO.

Witnesses:
P. E. STEVENS,
M. C. HILLYARD.